3,079,413
METHOD OF PRODUCING SHORT CHAIN METHYL ESTERS
Karl J. Moulton and Thomas W. Findley, La Grange, Ill., and Vasili I. Komarewsky, deceased, late of Chicago, Ill., by Jessie B. Komarewsky, executrix, Chicago, Ill., assignors to Swift & Company, Chicago, Ill., a corporation of Illinois
No Drawing. Filed July 5, 1960, Ser. No. 40,150
14 Claims. (Cl. 260—410.9)

The present invention relates in general to a method of producing short chain methyl esters. More specifically, the invention is directed to a method whereby certain long chain aliphatic esters are handled in such a manner that shorter chain esters are derived therefrom.

Short chain methyl esters are useful as intermediates in forming other compounds, can be hydrolyzed to form the corresponding acid (many of which, particularly the unsaturated fatty acids of less than 10 carbons, are unobservable in nature and/or commercially unavailable), and have usefulness, either alone or in combination, as antimycotic agents, larvicides, and nematocides. It is therefore evident that a method for preparing these substances would be of benefit in many industrial fields.

It has previously been observed that thermal treatment of higher aliphatic esters produces substantial decarboxylation and dehydration with formation of ketones and hydrocarbons. Other reports indicate that the predominant reaction upon pyrolysis of unsaturated $C_{18}$ fatty acid esters is polymerization, with 60–70% yields noted. Generally the reported prior work has involved batch pyrolysis at temperatures of from about 170–400° C. for extended periods of at least several hours.

It is an object of our invention to provide a method of handling higher aliphatic esters in such a manner that there is not extensive polymerization or decarboxylation (as evidenced by carbon dioxide make) and little formation of hydrocarbon gas or carbonization.

It is a further object of our invention to provide a method for handling long chain methyl esters such that shorter chain methyl esters rather than acids and their thermal degradation products are formed.

An additional object of our invention is to provide a method for directing the pyrolysis reaction of long chain methyl esters to produce shorter chain methyl esters.

Further objects and advantages of our invention will occur to those skilled in the art from a reading of the following description of our invention.

We have discovered that by subjecting unsubstituted higher methyl esters to vapor phase continuous reaction conditions shorter chain methyl esters are produced without extensive carbon dioxide make, hydrocarbon gas make, polymerization, or carbonization. Both saturated and unsaturated methyl esters will cleave along the alkyl chain when subjected to our manner of handling. When working with the unsaturates cleavage occurs at various points along the chain as evidenced by production of several fractions from one cracking procedure having substantially varying molecular weights and boiling point ranges. Generally we produce methyl esters ranging in chain length from $C_3$ to the chain length of the starting material. Regardless of the degree of saturation in the long chain methyl ester charge, unsaturation appears in the shorter chain methyl esters produced.

It appears that the unsubstituted methyl esters are unique in that esters of the longer alkyl radicals or alkylaryl radicals cleave in such a manner that little or no shorter chain ester remains. The substituted methyl esters appear to produce a number of different reaction products when subjected to vapor phase continuous reaction conditions.

More particularly, we have found that continuously passing the vaporized methyl ester charge through a reaction zone which will maintain vapor phase reaction conditions in the charge will cause cleavage along the carbon chain of the charge to produce shorter chain methyl esters as a product of the thermal treatment. The reaction vessel is preferably constructed of a material nonreactive with the charge, e.g., stainless steel, quartz, glass, etc. An apparatus such as that disclosed and claimed in U.S. Patent No. 2,952,527 to Findley et al., is eminently suitable for carrying out this reaction. However, any assemblage which can heat the ester charge sufficiently to vaporize it and then substantially immediately pass the vaporized charge into a reaction zone which will maintain vapor phase reaction conditions in the charge is adaptable to our process.

The reaction zone is preferably but not necessarily packed to provide more heating surface therein for the charge as it passes therethrough. This packing can be an inert material or a material catalytic to the reaction. Glass beads are illustrative of a substantially inert packing substance. As an example of a catalytic packing material we have found that packing the reaction zone with silica gel particles will catalyze the reaction to increase the percentage of shorter chain methyl esters formed in the process and decrease the reaction time required. The vaporized fatty ester charge is preferably swept into the reaction zone by means of a gas or vapor of low boiling liquid which is substantially unreactive with the charge. Illustrative of such substantially unreactive sweep gases are nitrogen, carbon dioxide, steam, and the like. Reactive gases, such as oxygen, may also be used in the reaction. Speed at which the sweep gas carries the charge into and through the reaction zone will be described more fully hereinafter.

The temperature in the reaction zone and the methyl ester charge as it is continuously swept therethrough should be in the range of about 800–1100° F. Temperatures below about 800° require too extensive a reaction time and approach batchwise conditions with attendant decarboxylation. Temperatures above about 1100° F. are generally not required to maintain continuous vapor phase reaction conditions. The charge is passed into the zone at such a rate that it exits the zone after remaining therein between about .5–70 seconds, and preferably about 20–40 seconds. The rate at which the charge is passed into the zone can more conveniently be spoken of in terms of the space velocity of the charge into the zone. "Liquid space velocity" is a general term used in the petroleum cracking industry and refers to the relative volume of liquid feed passing through a volume of reaction zone per unit time. In our method liquid space velocities between about 0.4 and 5 may be used. If, for example, the reaction zone volume is 200 cc. and the space velocity of 0.6 is chosen, 200 times 0.6 or 120 cc. of ester charge would be passed through the reaction zone per hour.

The reaction time, that is, time that the vaporized charge remains in the reaction zone, should preferably be varied inversely with the temperature maintained in the zone. We have found that the reaction will proceed approximately 50 times faster for each 100° F. increase in temperature. For example, if the reaction takes 20 seconds at 1000° F., it should take only about .5 second at 1100° F. The pressure within the zone should be so correlated with the temperature, nature of the charge, and reaction time as to maintain the charge in the vapor phase. It is therefore possible to use negative pressure (i.e. vacuum) conditions. Positive pressures up to about 3 atmospheres may be used, depending upon the other variables, when using a reaction vessel of the type disclosed in the aforementioned Patent No. 2,952,527.

As previously mentioned, the starting materials which we have discovered can be thermally treated continuously in the vapor phase to yield short chain methyl esters are the unsubstituted methyl aliphatic esters. Saturated and unsaturated methyl esters of fatty acids having a chain length of from 10–24 carbons are useful in our method. Specific examples of suitable starting materials include, but are not limited to, the unsubstituted methyl esters of capric, lauric, myristic, palmitic, stearic, arachidic, behenic, oleic, palmitoleic, petroselenic, vaccenic, erucic, gadoleic, elaidic, undecylic, undecylenic acids, and mixtures of these esters. We prefer to use the unsubstituted methyl esters of ethanoid and monoethenoid acids since polyethenoid acid esters yield polymeric products unless rigorous precautions are taken to prevent this, such as operating at extremely short reaction times.

After continuously passing the charge through the vapor phase reaction zone, we collect the products of the reaction, condense the condensable portion thereof, and separate the unreacted charge from the low boiling short change methyl esters and the hydrocarbons (both of which we have invariably found to contain terminal unsaturation). This mixture of short chain esters and hydrocarbons is useful as an intermediate and can be used as is for some purposes, e.g., as a moldicide. If it is desired to use the mixture, no further separation is required. However, further separation can be effected either by means of a saponification reaction to remove the hydrocarbon or by means of silica gel chromatography, a system which adsorbs the ester and permits the hydrocarbon to pass through. The soaps formed are useful as such for certain purposes, for example, as mold inhibitors. We can then fractionate the ester portion into constant boiling components to determine the range and amount of the various esters. As an aid to classifying the esters we can compare their boiling points with known data. There is but a slight difference in boiling points of saturated and unsaturated methyl esters. As has been mentioned we have found unsaturation in the short chain methyl esters in all cases as evidenced by infrared absorption. In cases where boiling point data is insufficient to identify the ester, other known means, such as saponification number, iodine value, molecular weight, solubility, etc., are used. The unreacted charge can then be recycled through the system to effect another vapor phase reaction with cracking of the charge resulting. We prefer that only 50% or less of the charge is cracked on one run, and preferably about 20–40%. When higher percentages of cracked product are formed, further cracking may occur; when lower percentages are formed, the yield may be impractically low.

The following examples are considered illustrative only and should not be construed as limiting upon the scope of our invention.

EXAMPLE I

Two samples of methyl oleate feedstock were vaporized by heating to vaporization temperatures. One sample was swept by carbon dioxide gas carrier into a glass reactor packed with glass beads. In the other sample steam was used as the sweep gas. The feedstock was passed through the reactor at a liquid space velocity of 0.5. Temperature was maintained at 1000°–1050° F. The products of the vapor phase reaction were collected in each run and the condensed liquid product fractionated under reduced pressure to determine the ratio of cracked, unreacted, and polymerized components. Methanol determination of the fractionated products conclusively showed that cracking had occurred along the carbon chain. Analyses showed that the product components consisted of shorter chain methyl esters, little decarboxylation, and that the unreacted feedstock fraction was unaffected by the severe heat. Infrared absorption and mass spectrograph indicated the products to be mixtures of terminally unsaturated methyl esters and hydrocarbons, with the corresponding terminally saturated substance.

EXAMPLE II

Redistilled methyl palmitate charge was pumped from a graduated cylinder into a vessel substantially corresponding to the vessel disclosed and claimed in U.S. Patent No. 2,952,527, the reaction zone of which was packed with 5 mm. diameter glass beads, at a liquid space velocity of 0.9 cc. charge per cc. packing per hour. One mol nitrogen per mol of charge pumped entered the vessel and swept the charge, vaporized by heat, over the packing in the reaction zone. The reaction zone and charge were maintained at a temperature of 1050° F. ±5° F. At this rate of flow the charge will remain in the reaction zone for approximately 25 seconds and will then be discharged from the zone and the discharged products permitted to flow through a condensing system which allowed the liquid to collect in a tared receiver and the noncondensable gas to pass through a gas meter and gas collecting vessel. Representative samples of the noncondensable gas were collected and analyzed for carbon dioxide, olefin, and paraffin using published methods. The recovered liquid was separated, fractionated, and analyzed. The following data were found:

Table 1

84.0% total liquid recovery (by weight)
    13.8% shorter chain methyl esters
        2.4% methyl acrylate
        1.0% ester of average mol. wt. of 112
        10.4% ester of average mol. wt. of 191
    9.0% cracked hydrocarbon
        3.4% of B.P. <50° C. at 5 mm. Hg
        5.6% of B.P. 50–166° C. at 5 mm. Hg
    54.7% unreacted charge (methyl palmitate)
    6.5% polymerized (residue)
15.9% gas make recovery (by weight), or 1.23 mols/mol charge
    0.07 mol $CO_2$/mol charge
    0.86 mol olefin/mol charge
    0.30 mol paraffin/mol charge
0.1% carbon (by weight) deposited on packing We have found methyl esters of all of the terminally unsaturated acids up to $C_{12}$ acids in the cracked portion of the methyl palmitate feedstock. Examples are methyl acrylate, methyl 3-butenoic acid, methyl 4-pentenoic acid, etc., up to methyl 11-dodecenoic acid. There is also iodine number evidence to the fact that a portion of the methyl esters are of saturated acids, probably of butyric and higher acids.

A run identical to that set out above, except that the temperature was 850° F., was made wherein 1.25 mols oxygen was metered into the reaction zone in a manner such that it did not mix with the vaporized methyl palmitate charge until they reached the reaction zone. 24.1% condensable cracked product and 67.5% unreacted charge resulted. On gas analysis, no free oxygen was found. 4.5% water was formed and some hydrogen gas. This run indicates that the reaction temperature can be lowered when oxygen is used in the reaction.

EXAMPLE III

Three vaporized charges of methyl palmitate and three of methyl oleate were continuously swept through a vapor phase reaction zone maintained at 1050° F. and 1000° F. respectively. The sweep gases were nitrogen, carbon dioxide, and steam. The packing material was glass beads. A space velocity of about 1 provides for approximately 22 seconds' time in the reaction zone, while the space velocity of 0.4 provides for approximately 70 seconds in the zone. The following results were noted:

Table 2

| Feedstock | Methyl oleate | | |
|---|---|---|---|
| Temperature | 1,000° F. | | |
| Sweep gas | N₂ | CO₂ | Steam |
| Mols gas/mol feed | 0.3:1 | 1:1 | 1:1 |
| Space velocity | 0.4 | 1 | 1 |
| Product analysis (weight percent): | | | |
| Gas | 15 | 7.4 | 5.7 |
| Cracked ester | } 47 | 8.8 | 9.7 |
| Cracked hydrocarbon | | 4.5 | 4.2 |
| Unreacted feed | 31 | 74.0 | 72.2 |
| Polymerized | 6 | 5.3 | 8.2 |
| Carbon deposited | 0 | 0.1 | 0 |
| Feedstock | Methyl palmitate | | |
| Temperature | 1050° F. | | |
| Sweep gas | N₂ | CO₂ | Steam |
| Mols gas/mol feed | 1:1 | 1:1 | 1:1 |
| Space velocity | 1 | 1 | 1 |
| Product analysis (weight percent): | | | |
| Gas | 15.9 | 17.0 | 16.0 |
| Cracked ester | 13.8 | 12.5 | 15.2 |
| Cracked hydrocarbon | 9.0 | 9.6 | 10.5 |
| Unreacted feed | 54.7 | 54.0 | 58.5 |
| Polymerized | 6.5 | 6.9 | 9.8 |
| Carbon deposited | 0.1 | 0 | 0 |

EXAMPLE IV

Methyl palmitate was run through continuous vapor phase reaction conditions following substantially the same procedures as outlined in Example III except that the reaction zone was packed with silica gel. The following data were obtained:

Table 3

| Feedstock | Methyl palmitate | | | | | |
|---|---|---|---|---|---|---|
| Temperature | 1,000° F. | | | 1,050° F. | | |
| Sweep gas | N₂ | CO₂ | Steam | N₂ | CO₂ | Steam |
| Mols gas/mol feed | 1:1 | 1:1 | 1:1 | 1:1 | 1:1 | 1:1 |
| Space velocity | 1 | 1 | 1 | 1 | 1 | 1 |
| Product analysis (weight percent): | | | | | | |
| Gas | 10.9 | 8.7 | 10.8 | 22.0 | 18.5 | 24.0 |
| Cracked ester | 13.0 | 11.6 | 35.2 | 40.3 | 13.1 | 13.3 |
| Cracked hydrocarbon | 6.2 | 4.5 | 9.8 | 12.3 | 8.9 | 17.7 |
| Unreacted feed | 68.2 | 69.0 | 40.3 | 22.2 | 53.0 | 41.8 |
| Polymerized | 1.6 | 7.0 | 3.8 | 3.5 | 6.3 | 2.8 |
| Carbon deposited | 0.1 | 0.1 | 0.2 | 0.3 | 0.2 | 0.2 |

EXAMPLE V

Methyl palmitate was continuously swept by nitrogen gas through reaction zones maintained at various temperatures and with and without packing. The procedure followed was substantially that of Example II. The following results were obtained:

Table 4

| Reaction temperature | Packing | Percent liquid recovery | Percent ester cracked liquid, max. | Percent gas |
|---|---|---|---|---|
| 900 | Glass beads | 93 | 30 | 7 |
| 1,050 | do | 81 | 36 | 19 |
| 1,000 | None | 89 | 19 | 11 |

NOTE.—The ester values are given as maximum because they may contain some unreacted feedstock ester.

Obviously many modifications and variations of the invention as hereinbefore set forth may be made without departing from the spirit and scope thereof, and therefore only such limitations should be imposed as are indicated in the appended claims.

We claim:

1. The method of producing a mixture of short chain methyl esters and hydrocarbons which comprises: reacting unsubstituted methyl esters of higher fatty acids in the vapor phase at a temperature above the vaporization temperature of the esters but below about 1100° F., collecting the condensable reaction products including short chain methyl esters and hydrocarbons, and separating the short chain products from the unreacted unsubstituted methyl esters.

2. The method of causing cleavage along the carbon chain of an unsubstituted methyl ester of a higher fatty acid to produce shorter chain methyl esters which comprises: continuously passing a vaporized charge of said unsubstituted esters through a reaction zone maintained at a temperature between about 800° F.–1100° F. at a space velocity of said charge of between about 0.4 and 5 and at a pressure so correlated with the temperature and nature of the charge as to maintain said charge in the vapor phase whereby reaction products including short chain methyl esters will be formed, and collecting said reaction products.

3. The method of producing short chain methyl esters which comprises: continuously passing a vaporized charge comprising unsubstituted methyl esters of higher fatty acids through a reaction zone maintained at a temperature of between about 800–1100° F. at a space velocity of said charge of between about 0.4 and 5 and at a pressure so correlated with the temperature as to maintain said charge in the vapor phase whereby said charge is thermally reacted to produce reaction products including low boiling short chain methyl esters and hydrocarbons, collecting said reaction products, condensing the condensable portion thereof, and separating the low boiling products from the unreacted charge.

4. The method of producing methyl esters which comprises: continuously vaporizing a liquid charge comprising unsubstituted methyl esters of fatty acids containing 10–24 carbons, continuously passing said vaporized charge under such pressure and at such a space velocity through a reaction zone maintained at a temperature above the vaporization temperature of the esters but below about 1100° F. to cause a vapor phase reaction in said zone, collecting the products of said reaction and removing low boiling methyl esters therefrom.

5. The method of producing terminally unsaturated methyl esters having 2–15 carbons which comprises: continuously vaporizing unsubstituted methyl esters of fatty acids containing 10–24 carbons, continuously passing said vaporized esters through a reaction zone maintained at a temperature between about 800–1100° F. at a space velocity of said vaporized esters of between about 0.4 and 5 and at a pressure so correlated with the temperature and space velocity as to maintain said esters in the vapor phase whereby said esters will cleave along the carbon chain to produce terminally unsaturated methyl esters having 2–15 carbons and olefins, collecting the reaction products, condensing the condensable portion thereof, and removing the cracked product from the unreacted esters in said condensed portion.

6. The method of claim 5 wherein the vaporized esters are passed through the reaction zone by means of a sweep gas.

7. The method of claim 5 wherein the unsubstituted methyl esters of fatty acids containing 10–24 carbons are selected from the group consisting of unsubstituted methyl esters of saturated and mono-unsaturated fatty acids.

8. The method of producing short chain methyl esters which comprises: continuously vaporizing an unsubstituted higher fatty acid methyl ester charge, sweeping said charge immediately after vaporization into and through a reaction zone containing a packing material, said reaction zone being maintained at a temperature of between about 800°–1100° F., said charge being swept through said zone at a space velocity such that said charge will remain in said zone for between about .5 and 70 seconds, said charge being at a pressure so correlated with the pressure and size of said zone as to maintain said charge in the vapor phase while in said zone, whereby a portion of said charge will cleave along the carbon chain thereof, collecting the reaction products and unreacted charge as they exit said zone, and separating the short chain methyl esters from said reaction products.

9. The method of claim 8 wherein the unsubstituted methyl ester is methyl palmitate.

10. The method of claim 8 wherein the unsubstituted methyl ester is methyl oleate.

11. The method of claim 8 wherein the packing material is catalytic to the cleavage reaction.

12. The method of claim 8 wherein the packing material is silica gel.

13. The method of producing short chain methyl esters which comprises: continuously vaporizing a methyl palmitate charge, sweeping said charge immediately after vaporization into and through a reaction zone maintained at about 1050° F., said charge being under about one atmosphere of pressure and being swept into said zone at a space velocity of about 1 whereby said charge will react in the vapor phase to produce reaction products including terminally unsaturated methyl esters having carbon chain lengths less than $C_{16}$, and collecting said reaction products.

14. The method of producing short chain methyl esters which comprises: continuously vaporizing a methyl oleate charge, sweeping said charge immediately after vaporization into and through a reaction zone maintained at about 1050° F., said charge being under about one atmosphere of pressure and being swept into said zone at a space velocity of about 1 whereby said charge will react in the vapor phase to produce reaction products including terminally unsaturated methyl esters having carbon chain lengths less than $C_{18}$, and collecting said reaction products.

References Cited in the file of this patent
UNITED STATES PATENTS

| | | |
|---|---|---|
| 1,991,955 | Ralston | Feb. 19, 1935 |
| 1,991,956 | Ralston | Feb. 19, 1935 |
| 2,107,904 | Pool | Feb. 8, 1938 |
| 2,133,007 | Ralston et al. | Oct. 11, 1938 |
| 2,145,802 | Ralston et al. | Jan. 31, 1939 |
| 2,145,803 | Ralston et al. | Jan. 31, 1939 |
| 2,145,804 | Ralston et al. | Jan. 31, 1939 |
| 2,807,633 | Wetroff et al. | Sept. 24, 1957 |
| 2,821,543 | Etherington | Jan. 28, 1958 |
| 2,882,300 | Perry et al. | Apr. 14, 1959 |